United States Patent [19]

Caroon

[11] Patent Number: 4,829,636
[45] Date of Patent: May 16, 1989

[54] CRAB PICKING MACHINE

[75] Inventor: Linald R. Caroon, Lowland, N.C.

[73] Assignee: A. O. & ME, Inc., Lowland, N.C.

[21] Appl. No.: 240,842

[22] Filed: Sep. 2, 1988

[51] Int. Cl.⁴ .............................................. A22C 29/00
[52] U.S. Cl. ........................................... 17/71; 17/48; 17/24
[58] Field of Search .......................... 17/71, 46, 48, 24; 193/3, 44; 198/345, 375

[56] References Cited

U.S. PATENT DOCUMENTS

| | | | |
|---|---|---|---|
| 2,502,091 | 3/1950 | Harris et al. | 17/71 |
| 4,073,041 | 2/1978 | Davis et al. | 17/71 |
| 4,293,981 | 10/1981 | Smith | 17/71 |
| 4,337,552 | 7/1982 | Iwase | 17/71 |
| 4,380,094 | 4/1983 | Tolley et al. | 17/71 |
| 4,503,586 | 3/1985 | Lockerby | 17/71 |
| 4,633,547 | 1/1987 | Caroon | 17/71 |

Primary Examiner—Willis Little
Attorney, Agent, or Firm—Brumbaugh, Graves, Donohue & Raymond

[57] ABSTRACT

An automatic loading apparatus that enables two workers to load crabs into a crab picking machine comprises a carriage mounted on guide rails for movement transversely on the conveyor above the loading station. Two crab holders are mounted in laterally spaced apart relation on the carriage, each holder being capable of receiving and holding a crab for placement from above onto a tray and of releasing the crab after it has been placed on the tray. Each crab holder is mounted on the carriage for movement between a loading position spaced apart above the tray and a releasing position in which the crab held by the holder is placed on the tray for release onto the tray. A transverse drive device moves the carriage along the rails to position the two crab holder back and forth alternately above the path of the trays in timed relation to the arrival of each tray at the loading station. A vertical drive moves the respective crab holders alternately from the loading position to the releasing position in timed relation to the arrival of each tray at the loading station.

8 Claims, 5 Drawing Sheets

CRAB PICKING MACHINE

BACKGROUND OF THE INVENTION

Caroon U.S. Pat. No. 4,633,547 describes and shows a crab picking machine in which crabs are conveyed, carapace up and head end forward, on two-part trays through three main work stations where the claws and carapace are removed (1st station), the crab is cut in approximately half lengthwise and from top to bottom (2nd station) and the meat is squeezed out through the open cut of each crab half by a roll (third station). The machine of the Caroon patent is remarkably effective in picking the crabs clean and removing the valuable back fin meat in large pieces. In the preferred embodiment, in which the trays are moved through the work station by a chain conveyor, very high throughput rates are possible. In fact, the speed capability of the machines is limited by the ability to load the crabs onto the trays, which is done manually, as the trays return to the loading station at the front of the machine. The Caroon patent is incorporated by this reference to it into the present specification.

SUMMARY OF THE INVENTION

An object of the present invention is to provide, as an improvement in the machine of the Caroon patent, an automatic loading apparatus that enables two workers to feed crabs to the machine and thereby take full advantage of the high speed capability of the machine. Accordingly, processors require fewer machines and less floor space for a given processing capacity. Also, proper loading of the trays is better assured, as compared to manual loading, because the motions of the loading apparatus are timed exactly to the arrival of each tray at the loading station. The manual loading of the loading apparatus is easier, and hence more likely to be done correctly, than manual loading of the crabs onto the trays. Each worker has ample time to prepare each crab for processing by removing its apron with the aid of a tool in front of the machine and to place the crab in the loading apparatus.

In particular, the present invention is a reciprocating feed shuttle that comprises a carriage mounted on guide rails for movement transversely on the conveyor above the loading station. Two crab holders are mounted in laterally spaced apart relation on the carriage, each holder being capable of receiving and holding a crab for placement from above onto a tray and of releasing the crab after it has been placed on the tray. Each crab holder is mounted on the carriage for movement between a loading position spaced apart above the tray and a releasing position in which the crab held by the holder is placed on the tray for release onto the tray. A transverse drive device moves the carriage back and forth along the rails to position the two crab holders alternately above the path of the trays in timed relation to the arrival of each tray at the loading station. A vertical drive moves the respective crab holders alternately from the loading position to the releasing position in timed relation to the arrival of each tray at the loading station.

For a better understanding of the invention, reference should be made to the following description of an exemplary embodiment, taken in conjunction with the accompanying drawings.

DESCRIPTION OF THE EMBODIMENT

Figure 1:
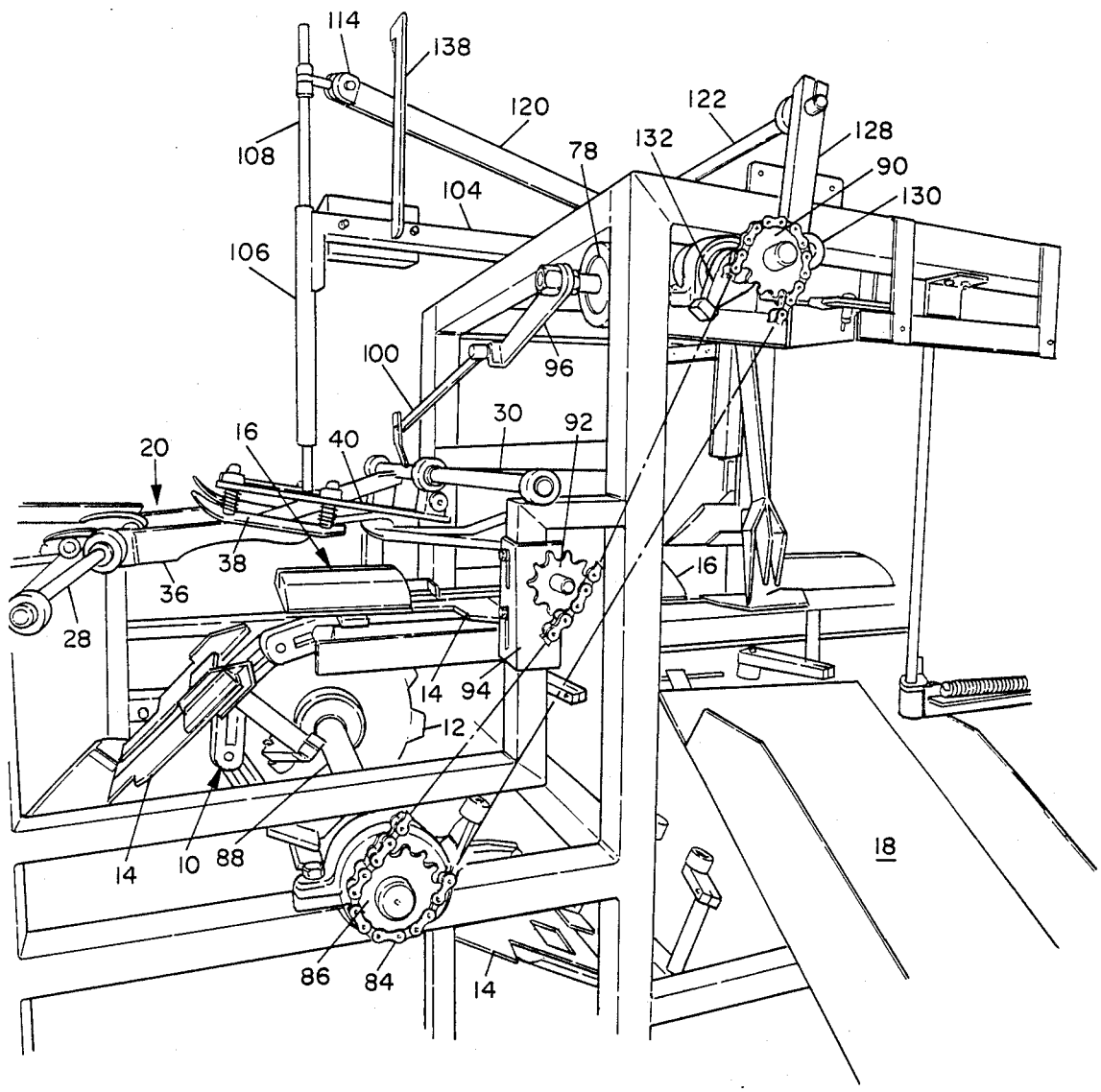
FIG. 1 is a pictorial view of the embodiment looking at the right side from a position abreast of the loading station and forward of the first work station.

In FIG. 1 of the drawings the reciprocating feed shuttle of the present invitation is generally in the lower left, and the front end of the picking machine itself is to the right. An endless chain 10 leads from a front sprocket 12 along an upper run to a rear sprocket (not shown) and returns along a lower run to the front sprocket. Brackets 14 pivotably attached to the chain 10 carry two-part trays 16 on which the crabs are conveyed, carapace up and head end forward, along the upper run through the three main work stations. The first work station, where the claws and carapace are removed, is shown generally at the right of FIG. 1, just above a sloping chute 18 onto which the carapace and claws fall and by which they are removed to the side of the machine. Reference may be made to the Caroon patent for a full description and illustration of the picking machine.

The feed shuttle loading apparatus is located generally above the front sprocket 12, where the trays reach a horizontal position after moving over the sprocket and at the start of the upper run of the chain 10. A carriage 20, which is mounted above the path of the trays 16 as they arrive seriatum at the front end of the upper chain run, moves transversely of the machine to position two crab holders mounted on it alternately above the arriving trays. The carriage comprises a front tube 22 and a rear tube 24 rigidly joined together by a connector bar 26. The carriage tubes are slidably received on front and rear support rods 28 and 30 that are affixed to the machine frame at each end. For assembly purposes, the rods 28 and 30 are received in short mounting tubes 32 welded to the frame and secured endwise by collars 34 affixed to the rods outwardly of each mounting tube. Each of the two crab holders carried by the carriage consists of a blade-like lower holder arm 36, which is mounted on the front carriage tube 22 to pivot about the tube axis, and an upper holder shoe 38, which is carried by an upper holder arm 40. The shoe 38 is a plate that is bent transversely to present a concave lower surface into which the crab carapace can nest and bent up at the front tip 38a to present a guide or cam surface to facilitate pushing of the crab from in front between the shoe 38 and the arm 36. Posts 42 extend up from the shoe 38 slidably through holes 44 in the upper holder arm 40 and receive collars 46 near their upper ends to stop downward movement under the bias of a compression spring 48 received by each post 42 between the arm 40 and the shoe 38. The shoe 38 can, accordingly, move upwardly toward the arm 40 against the bias of the spring 48.

Figure 3:
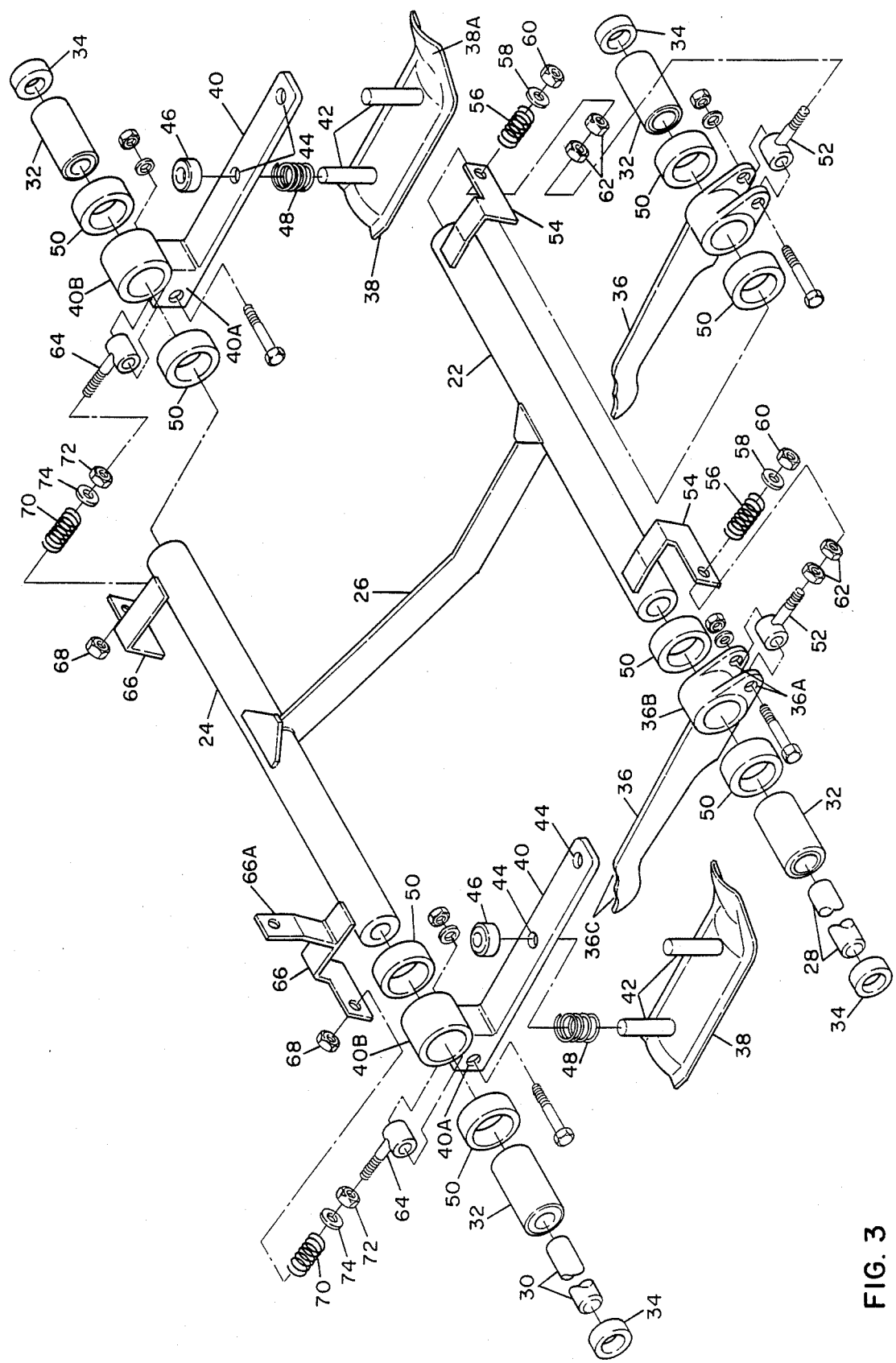
FIG. 3 is an exploded pictorial view of the carriage and crab holders of the embodiment.

Each lower holder arm 36 is retained endwise of the carriage tube 22 by collars 50 secured by set screws (not shown). (Both carriage tubes 22 and 24 are foreshortened in FIG. 3 to enable the scale of the drawing to be relatively large, while still fitting the drawing onto the sheet—the arms and collars fit on the end portions of the tubes outboard of the brackets 66). Lugs 36a on the sleeve mounting portion 36b of the arm 36 receive a T-link 52 which passes through a hole in a reaction bracket 54 and receives a compression spring 56, a washer 58, and a nut 60. The spring 56, compressed between the bracket 54 and the nut 60, biasses the arm to pivot on the carriage tube 22 such as to hold the holder arm 36 in an upward stop position established by stop nuts 62. Lugs 40a on the mounting sleeve portion 40a of the upper holder support arm 40 are linked by a T-link 64 to a bracket 66. The arm 40 is biassed to pivot to an upper stop position (nut 68) by a spring 70 compressed between the bracket 66 and a nut and washer 72 and 74.

The crabs are inserted manually into the holder by pushing them rearwardly along the lower holder arm 36 toward the upturned front tip 38a of the upper holder shoe 38 and forcing them between the arm 36 and shoe 38. The tip 38a of the shoe acts like a cam in opening up a space between the arm and shoe to accept the crab by forcing the springs 48 associated with the shoe to yield and causing upward displacement of the shoe. The upper edge of the tip end of the lower holder arm 38 has concavities 36C shaped to accept the underbody of the crab in nested relation.

Figure 2:
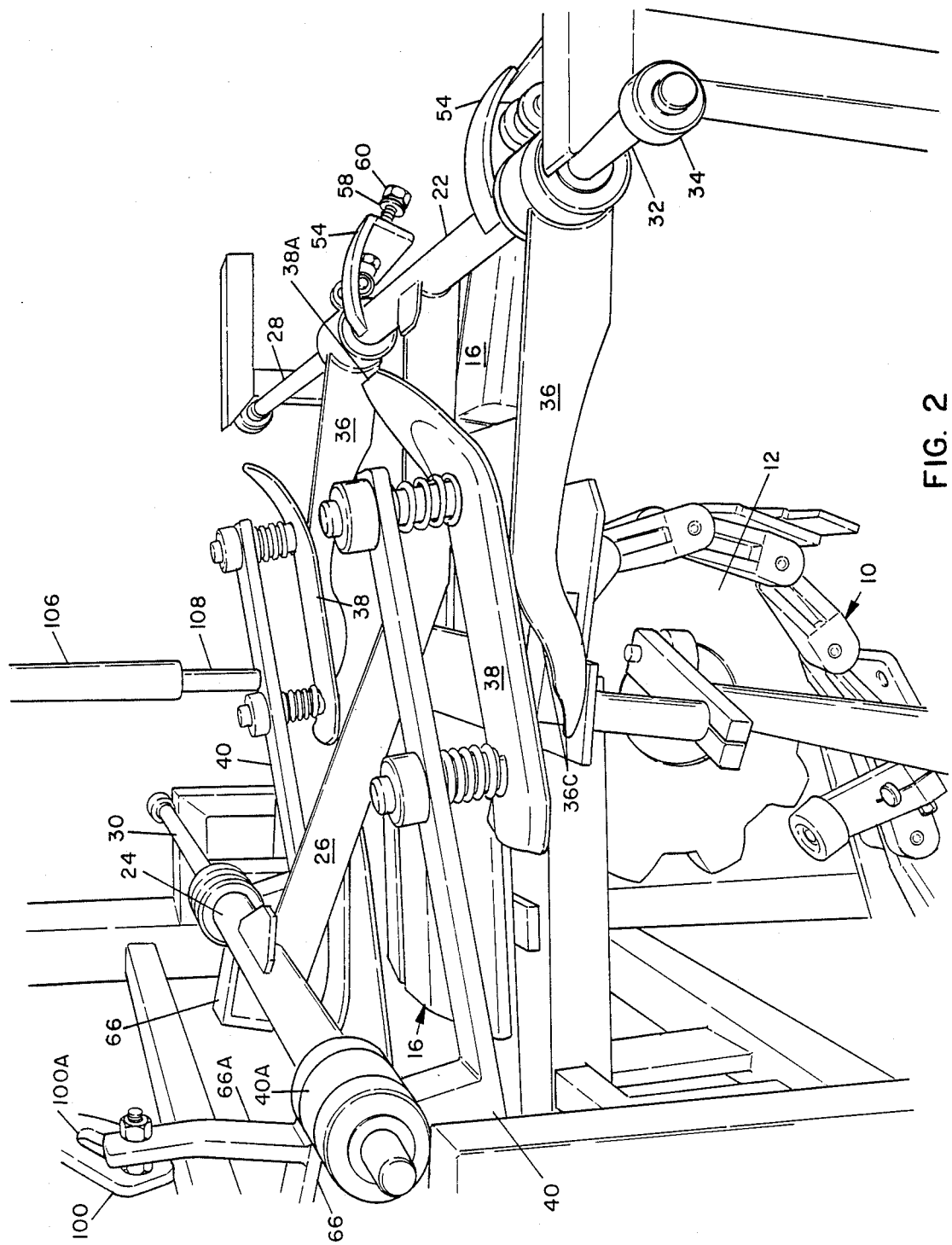
FIG. 2 is a pictorial view of the embodiment looking at the left side from a position abreast of the loading station and closer to the machine than FIG. 1.

The upper holder shoe 40 can tilt end to end to present a rake for self-conformity to the carapace of the crab. In the upward stop position of the holder (see FIG. 2), the lower holder arm has an upward rake from front to rear, while the upper holder shoe has an upward rake from rear to front. Thus, the crab is caught between the lower rear part of the shoe and the front tip of the lower holder arm 36. When the holder is pushed down to place the crab on the tray, the rakes of the arm and shoe change, such as to open up the rear part of the holding space and thereby facilitate release of the crab forwardly from the rear of the holding space as the tray leaves the loading station.

Figure 4:
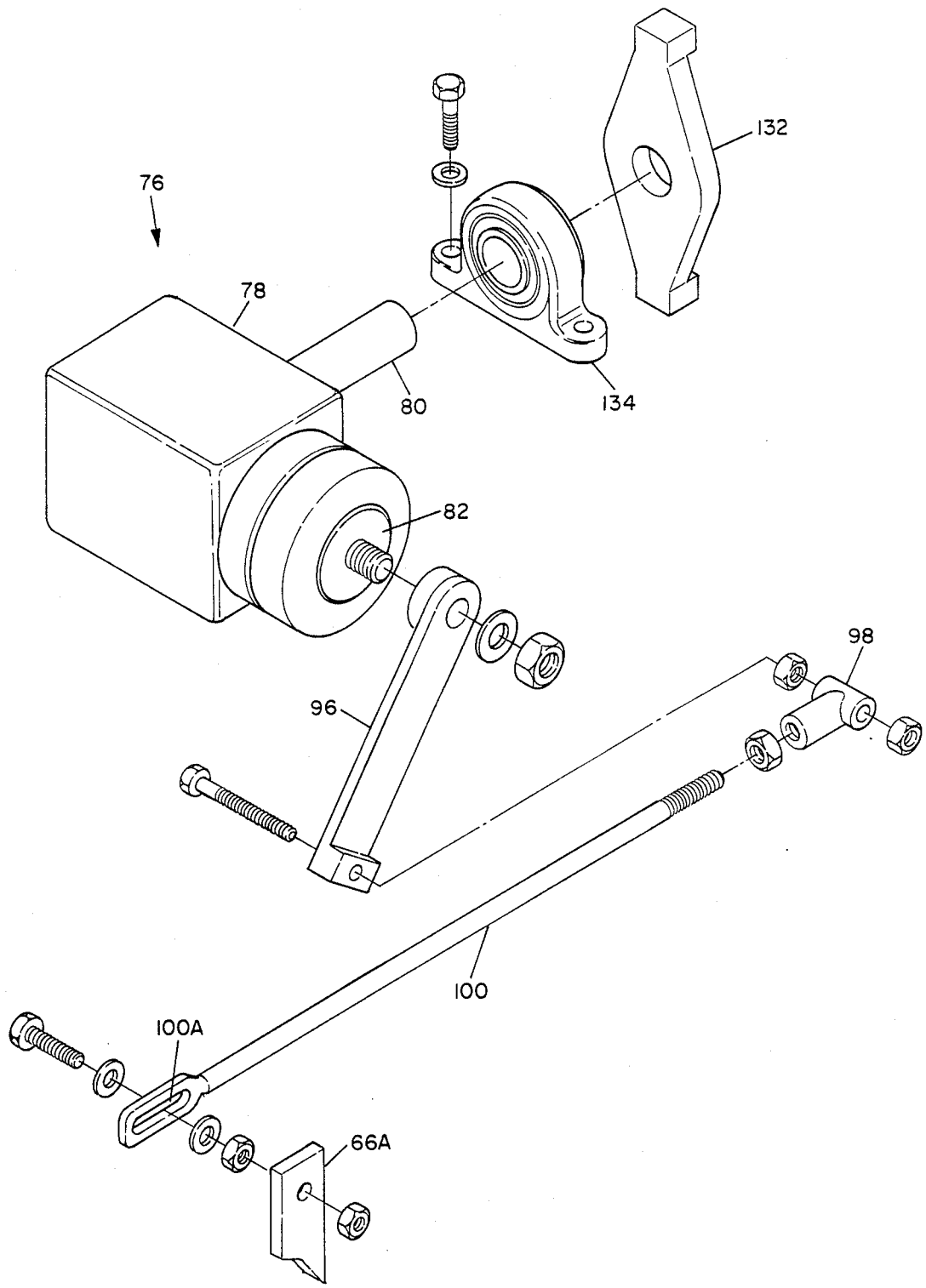
FIG. 4 is an exploded pictorial view of the transverse drive mechanism for the carriage.

The carriage 20 is moved back and forth transversely of the machine and along the rails 28 and 30 that support it by a transverse drive mechanism 76 shown in FIG. 4. A transmission 78 that converts continuous rotary motion of its input shaft 80 into oscillatory rotary motion of its output shaft 82 is mounted on the machine frame above the feed station. A continuous link chain 84 (see FIG. 1) driven by a sprocket 86 fixed to the shaft 88 of the conveyor chain sprocket 12 drives a sprocket 90 affixed to the transmission input shaft 80. An idler sprocket 92 journaled on an adjustable bracket 94 enables the tension in the chain 84 to be adjusted. A drive arm 96 affixed to the transmission output shaft 82 is coupled rotatably to a T-coupling 98 that is threaded onto one end of a drive rod 100. The other end of the drive rod 100 is connected to a leg 66a of the bracket 66. A slot 100a in the rod provides lost motion of the rod at each extremity of its stroke, so that the carriage dwells briefly at the end of each traverse of the machine.

Figure 5:
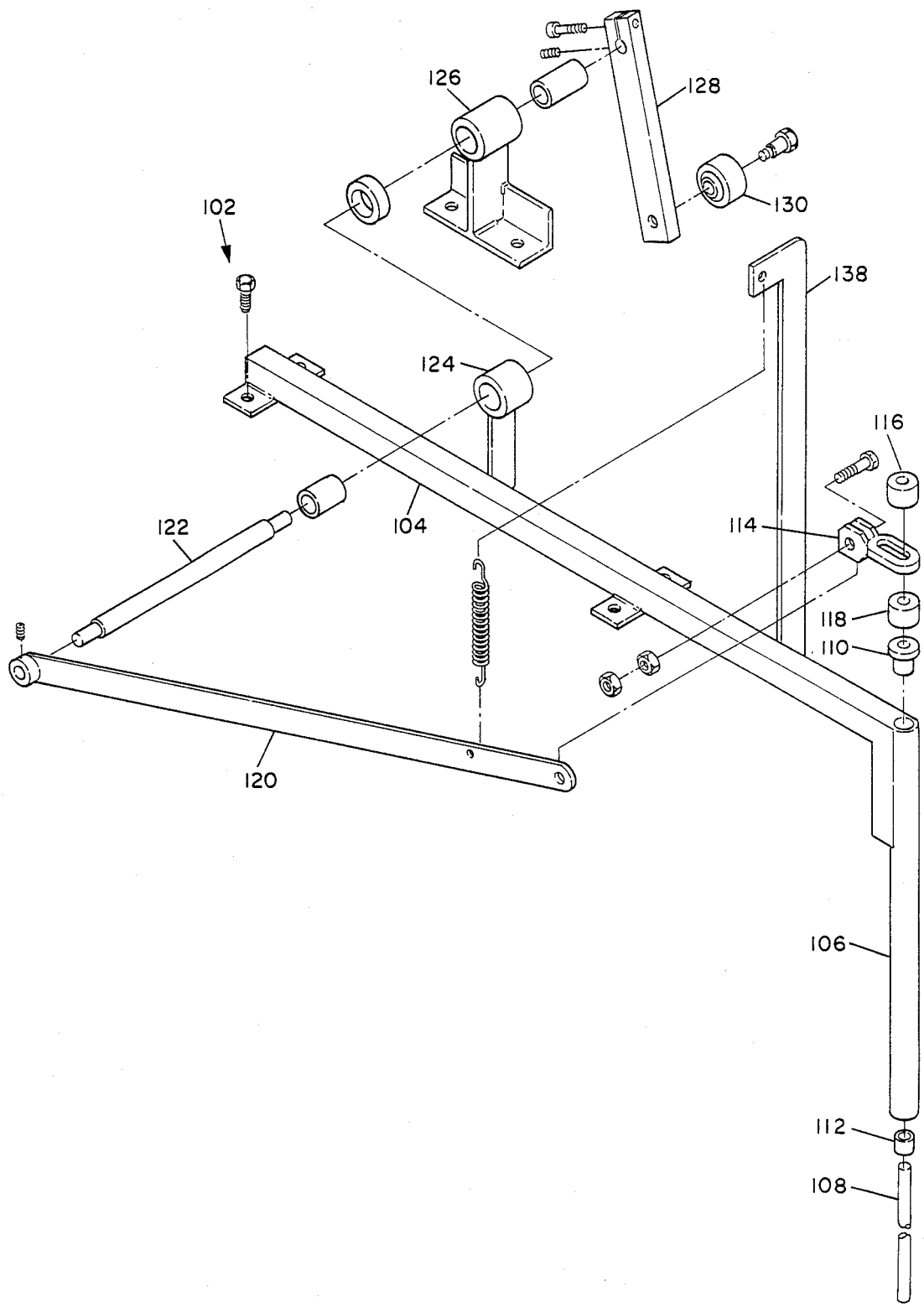
FIG. 5 is an exploded pictorial view of the vertical drive mechanism for the crab holders.

At the end of the traverse of the carriage to the left side, the right crab holder resides above a tray 16 arriving at the feed station, while the left crab holder resides at the left side of the machine where a worker loads a crab onto the holder. During the dwell time, a vertical actuator mechanism 102 shown in FIG. 5 pushes down on the upper crab holder arm 44, thereby pivoting the upper holder shoe 38 and the lower holder arm 36 of the right holder against the biasses of their respective springs 70 and 56 about the carriage tubes 24 and 22. The free end of the lower holder arm 36 moves down into the gap between the two halves of the tray 16, and the crab in the right holder is pressed by the shoe onto the tray. Each tray half has several pins (not shown) sticking up from its upper surface on which the crab is impaled. Once it is impaled on the pins, the crab is pulled forward on the moving tray and dislodged from between the holder arm 36 and holder shoe 38. Having thus been transferred from the holder to the tray, the crab is conveyed through the machine and picked in the manner described in Caroon U.S. Pat. No. 4,633,547.

The vertical actuator mechanism 102 (FIG. 5) comprises a support arm 104 that is fastened to the machine frame and carries at its front end a vertical guide tube 106. A push rod 108 is supported for free vertical movement in the guide tube by bushings 110 and 112 pressed into the upper and lower ends of the tube. The upper end of the push rod is axially affixed to a coupling 114 by collars 116 and 118. The coupling 114 is pivotably connected to one end of a drive arm 120. The other end of the arm 120 is fixed to a drive shaft 122 supported by journals 124 and 126. A drive arm 128 is affixed at one end to the shaft 122 and carries a cam follower roller 130 at its other end. A cam 132 (see FIG. 4) affixed to the transmission shaft 80 outboard of its journal support 134 drives the arm counterclockwise (relative to FIG. 1), thereby pushing the front end of the link 120 down, at the beginning of the dwell time of each crab holder at the loading station. The arm, in turn, drives the push rod 108 down to deposit the crab on the tray, as described above. Just before the end of the dwell time of the crab holder at the feed station, the push rod is allowed to retract under the bias of a tension spring 136 connected between the link 120 and a spring support bracket 138.

During the dwell of the carriage at the left, the worker at the left of the machine, having removed the apron from the next crab, pushes the crab into the left crab holder. The carriage is then driven from left to right. Meanwhile, the right worker prepares another crab and is ready to load that crab into the right crab holder when it arrives and dwells at the right side of the machine. When the carriage reaches the right end of its traverse, the vertical drive device unloads the crab in the left holder onto an arriving tray, and the worker on the right side loads the right holder with the next crab.

I claim:

1. In a crab picking machine in which each of a series of two-part trays is moved through three main work stations, each tray part supporting approximately one lengthwise half of a crab with its carapace up and head forward, and in which at the work stations the claws and carapace are removed, the crab is cut in approximately half lengthwise, and the meat is squeezed out through the open cut of each crab half by a roll, the improvement of a reciprocating feed shuttle for automatically placing a crab on each tray as the trays move seriatum past a loading station ahead of the first work station comprising a carriage mounted on guide rails for movement transversely of the conveyor above the loading station, first and second crab holder means mounted in laterally spaced apart relation on the carriage, each holder means receiving and holding a crab for placement from above onto a tray and releasing the crab after it has been placed on the tray, means mounting the crab holder means on the carriage for movement between a loading position spaced apart above the tray to a releasing position in which the crab held by the holder means is placed on the tray for release onto the tray, means for moving the carriage along the rails to position the first and second crab holder means alternately above the path of the trays in timed relation to the arrival of each tray at the loading station and means for moving the first and second crab holder means alternately from the loading position to the releasing position in timed relation to the arrival of each tray at the loading station.

2. The improvement according to claim 1 wherein each holder means comprises a blade-like guide movably mounted on the carriage, formed to engage the underside of the crab and receivable in a gap between the tray parts to enable the crab to be engaged and be released onto the tray and a shoe movably mounted on the carriage and engageable with the carapace of the crab to hold it on the guide.

3. The improvement according to claim 2 wherein the carriage includes a front member located forwardly of the loading station and a rear member located rearwardly of the loading station, the guide is pivotably mounted on the front carriage member and extends rearwardly in cantilevered relation and the shoe is mounted on the rear carriage member and extends forwardly in cantilevered relation, whereby the crabs can be slid between the guide and shoe from in front of the loading station.

4. The improvement according to claim 3 wherein the guide of each holder means is resiliently biassed toward the loading position and the shoe of each holder member is resiliently biased toward the guide such that the crab is held resiliently between the guide and shoe.

5. The improvement according to claim 4 wherein the shoe of each holder means is carried by a support arm, the support arm is pivotably supported on the rear carriage member and is biased relative to the support arm toward the guide and the support arm is resiliently biased relative to the rear carriage member toward the loading position of the holder means.

6. The improvement according to claim 5 wherein the means for moving the holder means to the releasing position includes a push rod positioned above the loading station and movably selectively to engage and move the support arm, shoe, and guide from the loading position to the releasing position against the bias applied to the guide and support arm.

7. The improvement according to claim 3 wherein the shoe is a plate-like member having an upturned front edge presenting a cam guide surface for the crab as it is slid rearwardly between the shoe and the guide.

8. The improvement according to claim 5 wherein in the loading position of each holder means the guide has a rake upwardly toward the rear and the shoe has a rake upwardly toward the front, whereby in the loading position the crab is held against release to the rear from between the guide and shoe, and wherein the pivotal movements of the guide and the shoe to the releasing position changes their rakes and facilitates release of the crabs by sliding rearwardly from the engaged position as the tray moves away from the loading station.

* * * * *